United States Patent [19]

Cheng-Shiang

[11] Patent Number: 4,721,591
[45] Date of Patent: Jan. 26, 1988

[54] METHOD FOR THE PREPARATION OF CROSS-LINKED POLYETHYLENE FOAMS AND FOAMS PRODUCED BY THE METHOD

[75] Inventor: John S. Cheng-Shiang, Madrid, Spain

[73] Assignee: Dow Chemical Iberica S.A., Madrid, Spain

[21] Appl. No.: 880,998

[22] Filed: Jul. 1, 1986

[30] Foreign Application Priority Data

Jul. 3, 1985 [GB] United Kingdom ................ 8516825

[51] Int. Cl.$^4$ .............................................. B23K 7/04
[52] U.S. Cl. .......................... 264/54; 264/DIG. 18; 264/DIG. 65; 521/79; 521/81; 521/140; 521/143
[58] Field of Search ............... 264/DIG. 18, DIG. 65, 264/54; 521/140, 134, 79, 81

[56] References Cited

U.S. PATENT DOCUMENTS

| | | | |
|---|---|---|---|
| 3,651,183 | 3/1972 | Hosoda et al. | 264/DIG. 18 |
| 3,812,225 | 5/1974 | Hosoda et al. | 264/DIG. 18 |
| 4,163,083 | 7/1979 | Kühnel et al. | 264/DIG. 18 |
| 4,166,890 | 9/1979 | Fried et al. | 264/DIG. 18 |
| 4,255,371 | 3/1981 | Shimoyashiki et al. | 264/DIG. 18 |

*Primary Examiner*—Morton Foelak

[57] ABSTRACT

A foam of cross-linked polyethylene having microcell structure is prepared using a chemical cross-linking initiator having a 10 hours half life temperature of from 80° to 110° C. In a preferred embodiment, the chemical cross-linking agent is employed in combination with co-cross-linking agent such as triallyl cyanurate.

10 Claims, No Drawings

METHOD FOR THE PREPARATION OF CROSS-LINKED POLYETHYLENE FOAMS AND FOAMS PRODUCED BY THE METHOD

The present invention relates to a method for the preparation of cross-linked polyethylene foams, particularly to a continuous method for preparing cross-linked polyethylene foams having a so-called microcell structure.

Heretofore, low density polyethylene has been extensively employed in the preparation of foamed material. In certain applications, due to its superior insulation values, flexibility ("softness") and better feel, the low density polyethylene foam is advantageously prepared having a so-called microcell structure. Foams having the microcell structure normally exhibit at least 30 cells/centimeter (cell/cm) (or a cell size of from 0.02 to 0.3 mm) as compared to about 15 to 18 cells/cm (a cell size from 0.5 to 1 mm) in a conventional foam.

There are two basic methods for the commercial preparation of low density polyethylene foams. In one conventional method, low density polyethylene is mixed with a blowing agent, and, optionally, other additives. This mixture is subsequently prepared as a sheet material without significant expansion. Thereafter, the sheet material is exposed to ionizing radiation and subsequently to an elevated temperature by sequentially passing the sheet through a radiation-generating device and a hot air oven for example as described in U.S. Pat. No. 3,067,147. The polyethylene is cross-linked by means of the ionizing radiation and the sheet expanded at the elevated temperature due to the gases generated upon the decomposition of the blowing agent. Although the described method is suitable for the continuous preparation of low density polyethylene foams having a microcell structure, the radiation-generating device is capital intensive and requires substantial maintenance.

In the second conventional method for preparing foams from low density polyethylene, the low density polyethylene is mixed with a cross-linking agent or initiator such as an organic peroxide, a blowing agent and, optionally, other additives. This mixture is subsequently prepared as a sheet without significantly cross-linking the olefinic polymer or expansion. Thereafter, the sheet is heated to an elevated temperature in a hot air oven or similar type oven. In the heating operation, the organic peroxide decomposes, thereby cross-linking the polyethylene and the sheet expands due to the decomposition of the blowing agent. An example of such a process is disclosed in GB No. 1126857.

Unforunately, methods using a chemical blowing agent have not been successfully employed in the commercial production of low density polyethylene foams having a microcell structure and specifically GB No. 1126857 succeeds only in the production of foams which do not have a microcellular structure.

One method for preparing foams of a fine cell size (i.e., a "microcell" structure) using a chemical cross-linking agent is a batch type operation. (See, for example, U.S. Pat. No. 3,098,831). In a batch type operation, the polyethylene is mixed with an organic peroxide such as dicumylperoxide and a blowing or foaming agent. The resulting mixture is then molded (i.e., compressed) into slabs and cross-linked by heating, under pressure, at an elevated temperature (e.g., from 135° to 205° C.) for from 15 to 45 minutes. Subsequently, the temperature is further raised and the polyethylene expanded. Unfortunately, this, as well as other methods using a chemical cross-linking agent, have not been found to be useful in the continuous preparation of ethylene foams having a microcell structure. Specifically, although a foam having a fine cell size can be prepared using the described batch type operation, a continuous roll cannot be produced, thereby reducing the commercial attractiveness of the operation. Moreover, the operation is labor and capital intensive with limited art for the continuous preparation of a polyethylene foams having a so-called microcell structure, it productivity.

U.K. Patent Specification No. 1596448 discloses an additional method of forming low-density polyethylene foams, in which organic peroxide cross-linking initiators are utilised. In the method therein disclosed, a "cross-linking activator" (a "kicker") is utilised, which lowers the decomposition temperatures of the peroxide. Such "kickers" are aromatic carboxylic or aliphatic fatty acid salts of transition metals of sub-groups 7 and 8 of the periodic table, such as cobalt or copper naphthenate. The degree of cross-linking in the initial cross-linking step is less than 60%. In practice, the presence of these "kickers" renders the polyolefin composition very difficult to handle, because the cross-linking agent starts to decompose immediately the "kickers" are added.

This results in it being impossible, when such "kickers" are utilised, to form the polyolefin composition into a sheet in a continuous process whilst at the same time carrying out sufficient cross-linking before foaming is commenced to produce a microcell structure. Thus, although Example 3 of GB No. 1596448 describes the production of a microcellular foam, it is produced only in a batch process. Example 4 of GB No. 1596448 is a continuous process, but does not produce a microcellular foam.

In view of the stated deficiencies in the prior art for the continuous preparation of a polyethylene foams having a so-called microcell structure, it remains highly desirable to provide a continuous method for the preparation of a polyethylene foam having a fine cell structure.

Accordingly, the present invention provides method for the continuous preparation of a cross-linked foam of a low density polyethylene or a blend of a low density polyethylene with one or more other polymer(s). The method comprises mixing the low density polyethylene, a blowing agent, a cross-linking initiator and, if employed, other polymer(s) and additives and forming this mixture into a sheet material without substantially cross-linking the olefinic polymer(s) and without substantial decomposition of the blowing agent. Thereafter, the sheet material is initially pre-heated at a first temperature at a first temperature of more than 80° C. and less than 110° C. and subsequently heated at a second and higher temperature. The cross-linking agent employed has a ten hour half-life temperature of more than 80° C. and less than 110° C.

Surprisingly, a cross-linked polyolefin foam having the desired microcell structure can continuously be prepared using a cross-linking agent having the specified half-life temperature at the specified low pre-heat temperatures and short pre-heat times. Specifically, using the specified cross-linking initiator, the olefinic polymer can be sufficiently cross-linked without substantially foaming the preformed sheet (i.e., without substantially decomposing the blowing agent during the pre-heating). Thereafter, the cross-linked, olefinic sheet can be formed to produce a cross-linked, polyethylene foam having a microcell structure. In the methods of the prior art using a chemical cross-linking initiator, the cross-linking initiators employed and the conditions required during the pre-heating to cross-link the polymer are such that the olefinic polymer is not sufficiently cross-linked prior to the decomposition of the blowing agent. Therefore, foams having a normal cell size could only be prepared by these methods.

Although foams having the desired microcell structure can be prepared by the method of the present invention using a chemical cross-linking initiator, in a preferred embodiment of the present invention, the foaming mixture further comprises a co-cross-linking agent such as triallyl cyanurate. The presence of the co-cross-linking agent in the foaming mixture further reduces the pre-heat times and/or temperatures required to cross-link the olefinic polymer(s). Therefore, using the co-cross-linking agent, the amounts, if any, of blowing agent decomposed during the cross-linking of the olefinic polymers can be further reduced. Therefore the quality of the foam and the effectiveness of the operation is yet further improved.

It is however disadvantageous in the method of the present invention to incorporate cross-linking initiator "kickers" (i.e. aromatic carboxylic or aliphatic fatty acid salts of transition metals of such groups 7 or 8), as disclosed in GB No. 1596448, and the compositions are preferably substantially free of such substances. The preferred compositions in accordance with the invention consist essentially of the olefin, blowing agent, cross-linking agent and other ingredients specified herein.

The foams of the present invention are prepared from a homo- or copolymer of an olefinic monomer such as ethylene. In general, the cross-linked olefinic polymer foams are advantageously prepared from a low density polyethylene. The term "low-density polyethylene" is used conventionally herein and refers to homopolymers of ethylene having a density from 0.91 to 0.94 grams per cubic centimeter (g/cc) at 20° C. Low density polyethylenes are illustrated by U.S. Pat. Nos. 3,756,996 and 3,628,918. The preferred low density polyethylenes are dependent on a variety of factors including the desired properties of the cross-linked, the olefinic foam. In general, the preferred low density polyethylenes empolyed in preparing the foam have a melt index from 0.2 to 10, more preferably from 1 to 6, most preferably from 2 to 5, grams/10 minutes as measured using the ASTM test method designated 1238-73.

The low density polyethylene can also advantageously be employed in combination with one or more other polymers. For example, it is often advantageous to prepare the foam from a combination of low density polyethylene and one or more other thermoplastic olefinic polymers such as a linear low density polyethylene, a high density polyethylene, an ethylene/vinyl acetate copolymer or derivatives thereof, a copolymer of ethylene and acrylic acid or an acrylic ester or a derivative thereof, or an olefinic ionomer.

Of these other olefinic materials, linear low density polyethylene is most often advantageously employed in combination with low density polyethylene. The term "linear low density polyethylene" is well known to those skilled in the art and is used conventionally herein. Illustrative of linear low density polyethylenes and techniques for the preparation are disclosed in U.S. Pat. Nos. 2,825,721, 2,993,876, 3,250,825 and 4,204,050 and European Pat. Application, Publication No. 0004966, all of which are herein incorporated by reference. In general, linear low density polyethylenes are the copolymerization product of ethylene with one or more -olefins having three or more carbon atoms such as 1-butene, 1-hexene or 1-octene. In general, the linear low density polyethylenes will comprise from 85 to 99, preferably from 93 to 97, mole per cent of polymerized ethylene and 15 to 1, preferably from 7 to 3, mole per cent of one or more -olefins.

The linear low density polyethylene will modify the properties of the foam and lower the temperature and/or time required for the pre-heating operation and the specific linear low density polyethylene, if any, and the amounts employed are dependent on the desired properties of the foam and the properties of the linear low density and low density polyethylenes. A property of the linear low density polyethylene which is of particular importance is its Vicat softening point or temperature. Preferably, the linear low density polyethylene will exhibit a Vicat softening temperature, as determined by ASTM test methods designated D-1525-75, of less than 115° C., more preferably less than 105° C. Most preferably, the Vicat softening temperature of the linear low density polyethylene is less than 100° C.

The amounts of linear low density polyethylene, if any, employed in combination with the low density polyethylene are dependent on the specific linear low density and low density polyethylenes employed, and the properties desired in the resulting foam. In general, if a linear low density polyethylene is employed, the foam will generally comprise from 1 to 75, preferably from 5 to 60, weight per cent of the linear low density polyethylene and from 30 to 99, preferably from 50 to 95, weight per cent of the low density polyethylene, said weight per cents being based on the total weight of the linear low density and low density polyethylenes in the foam.

If other olefinic polymers are employed, they are generally employed in an amount of more than 0.5 per cent but less than 20, more generally in an amount of from 5 to 40, weight per cent based on the total weight of olefinic polymer(s).

Most preferably, the cross-linked, olefinic polymer foam is prepared from low density polyethylene or a combination of from 5 to 30 weight per cent of a linear low density polyethylene and from 70 to 95 weight percent of a low density polyethylene.

In addition, minor amounts of an elastomer such as rubber (e.g., natural rubber of an ethylene-propylene-diene ("EPDM") rubber) can also be employed in combination with the low density polyethylene or the combination of the low density and linear low density polyethylenes. If employed, these rubber polymers will generally be employed in amounts of less than 15, preferably less than 10, weight per cent based on a total weight of the olefinic polymers employed in preparing the foam.

The blowing agents employed in preparing the cross-linked olefin polymer foams having the desired microcell structure include those materials which decompose or vaporize, preferably decompose, at a higher temperature than the softening of the polymeric components and which, when decomposed, generate a gas which foams the polymeric material. Preferably, the temperature at which the blowing agent decomposes is sufficiently high such that the sheet material is not significantly foamed during the pre-heating operation. In general, the blowing agent will have a decomposition temperature (with the liberation of gaseous materials) of at least 170° C., more preferably from 190° C. to 350° C. Representative examples of such blowing agents include dinitrozo pentamethylenetetraamine, azodicarbonamide, p,p-oxy-bisbenzene-sulfonyl hydrazide and p-toluene-sulfonyl-semicarbazide. Preferred as the blowing agent is azodicarbonamide.

The amounts of the blowing agent employed in preparing the foams by the method of the present invention are dependent on a variety of factors, particularly on the desired density of the resulting foam product. The density of the foam will generally advantageously vary between 10 and 250 kilograms per cubic meter ($kg/m^3$), with the density preferably being from 15 to 200, more preferably from 20 to 150, $kg/m^3$. In general, the blowing agent will be employed in an amount from 2 to 35 parts, by weight, per 100 weight parts of the polymeric material employed in preparing the foam. Preferably, the blowing agent is employed in an amount from 2 to 26, more preferably from 8 to 25, weight parts per 100 parts of the polymeric material.

The chemical cross-linking initiator employed in the practice of the present invention for the preparation of cross-linked olefinic polymer foams having the desired microcell structure are those having a ten hour half-life temperature (as measured in benzene at concentrations of 0.1 to 0.2M) of between 80° and 100° C. Representative cross-linking initiators having the specified half-life temperature include 1,1-di-tert-butylperoxy-3,3,5-trimethylcyclohexane 1,1-di-tert-butyl peroxycyclohexane, tert-butyl peroxy-3,3,5-trimethyl hexanoate, tert-butyl peroxy isopropylcarbonate, 2,2-di-tert-butyl peroxybutane, tert-butylperoxyacetate, 4,4-di-tert-butylperoxy-n-butyl valerate, 2,5-di-methyl-2,5-bis(benzoyl peroxide) hexane, tert-butyl peroxybenzoate, di-tert-butyl diperoxy phthalate, 2-tert-butyl-2-cyanopropane, 2-tert-butyl-1-cyanocyclohexane, o,o-tert-butyl-o-isopropyl monoperoxy carbonate, tert-butyl peroxy maleic acid, and 2,5-dimethyl-2,5-bis(octanoyl peroxy) hexane.

Of the desired chemical cross-linking initiators, those having a ten hour half life temperature from 85° to 100° C., most preferably from 85° to 95° C., are preferred in all cases. The most preferred chemical cross-linking initiator is 1,1-di-tert-butylperoxy-3,3,5-trimethyl cyclohexane.

Most preferably, the initiator is employed in combination with a co-cross-linking agent, particularly if the ten hour half life temperature is above 95° C.

Co-cross-linking agents which can be employed in combination with the cross-linking initiator are any compound having two or more reactive sites which when employed in combination with the cross-linking initiator reduces the time at a given temperature to cross-linked the olefinic polymer(s). By using a co-cross-linking agent, the olefinic polymer can be cross-linked at lower temperatures and/or shorter times. Therefore, during the pre-heat operation, the olefinic polymer can be sufficiently cross-linked with less chance for the decomposition of substantial amounts of the blowing agent and coincident foaming of the material.

Materials useful as a co-cross-linking agent herein are those materials which possess two or more reactive sites, preferably three ethylenically unsaturated groups. Representative of such materials are diallyl phthalate, divinylbenzene, triallyl cyanurate, butanediol diacrylate, hexanediol diacrylate, triethyceneclycol diacrylate, vinyl acrylate, butanediol divinylether, ethyleneglycol dimethylmethacrylate and pentaerithyritol tetraacrylate. Of such co-cross-linking agents, those compounds having three ethylenically unsaturated groups, particularly triallyl cyanurate and butanediol diacrylate, are preferred.

The amounts of the chemical cross-linking initiator and the co-cross-linking agent, if any, most advantageously employed in the practice of the present invention to prepare a cross-linked olefinic polymer foam having a microcell structure are dependent on various factors including the specific blowing agent, cross-linking initiator and co-cross-linking agent, if any, employed; the type and amount of polymeric materials employed in preparing the foam and the desired properties of the resulting foam.

One foam property of particular interest in determining the amounts of the cross-linking initiator and the co-cross-linking agent employed is the cross-linking degree of the foam. In general, the cross-linking degree of the foam is advantageously at least 65, preferably from 65 to 80, more preferably from 65 to 75, percent as measured by the techniques of ASTM method designated D-2765-68.

In addition, the rate at which the olefinic polymers are cross-linked during the pre-heating operation also greatly influences the amounts of the initiator and cross-linking agent which are employed. It is generally desirable that a significant portion of the olefinic polymer is cross-linked prior to substantial decomposition and/or foaming of the blowing agent. Specifically, the specific type of cross-linking initiator and co-cross-linking agent and their concentrations employed should be selected such that the cross-linking degree is at least 60 per cent prior to substantial decomposition of the blowing agent. It is advantageous if the cross-linking degree is at least 65 per cent following the pre-heating operation and the amounts of cross-linking initiator and co-cross-linking agent selected accordingly.

It has also been found that if the concentration of either the cross-linking initiator or the co-cross-linking agent is too large, the resulting foam may contain holes. Alternatively, if the concentration of the cross-linking agent and/or co-cross-linking agent is too low, the resulting foam will not possess the desired microcell structure. The amount of initiator and co-cross-linking agent are selected accordingly.

In general, the cross-linking initiator is advantageously employed in an amount from 0.1 to 2 weight parts and the co-cross-linking agent in an amount from 0.05 to 1 weight parts per 100 weight parts of the polymeric materials employed. Preferably, the cross-linking initiator is employed in an amount from 0.2 to 1, more preferably in an amount from 0.2 to 0.8, weight parts per 100 parts of the polymeric material. If employed, the co-cross-linking agent is preferably used in an amount from 0.1 to 0.75, more preferably from 0.2 to 0.6, weight parts per 100 parts of the polymeric material.

The foams prepared by the method of the present invention can contain additives such as antioxidants, pigments, flame retarding agents, antistatic agents and lubricants. Additives conventionally employed and their effects are well known in the art and reference is made thereto for the purposes of this invention.

In the practice of the present invention, the olefinic polymer(s), blowing agent, cross-linking initiator, cocross-linking agent, if any and other polymeric components and additives are initially mixed and the resulting mixture subsequently foamed. For example, in preparing a foam from a low density polyethylene, it is generally desirable to mix the flow density polyethylene, blowing agent, co-cross-linking agent, cross-linking initiator and other additives at conditions sufficient to form a homogeneous mixture of the components. This mixing operation preferably comprises dry blending the low density polyethylene with the other components. Thereafter, the dry blend is preferably extruded as a sheet material at a temperature above the temperature at which the polymeric components are softened. In general, the extrusion step is sufficient to form a composition of desired homogeneity. However, if required, increased homogeneity can be obtained by treatment in a Banbury mixer, a raw mill, a calendar or the like prior to extrusion.

If low density polyethylene is employed in combination with other polymeric materials to prepare the foam, the other polymeric materials are advantageously included in this mixing operation and the conditions of sheet extrusion adjusted accordingly. However, if a linear low density polyethylene is employed in combination with the low density polyethylene, to prevent significant cross-linking of the linear dow density polyethylene prior to the actual pre-heating/foaming operation, it is generally preferable to prepare a pre-mixture from the low density polyethylene, blowing agent, cross-linking initiator, co-cross-linking agent and any additives. Subsequently, this pre-mixture is blended, preferably dry blended, with the linear low density polyethylene. Prior to the blending of the linear low density polyethylene with the pre-mixture, the linear low density polyethylene can and, often advantageously is, dry blended with additional amounts of low density polyethylene or other polymeric material. Specifically, it is often advantageous to use only a portion of the low density polyethylene or other polymeric material in the preparation of the pre-mixture and to blend the remaining portion of the low density polyethylene or other polymeric material with a linear low density polyethylene. The resulting dry blended mixture of the polymeric components is then blended with the pre-mixture to form a composition which is subsequently extruded as a sheet material and thereafter foamed.

To prepare a foam of optimum uniformity, the sheet forming step is preferably conducted at conditions such that the olefinic polymer(s) is not significantly cross-linked. The extrusion conditions most advantageously employed to form the sheet while maintaining such low amounts of cross-linking are dependent on a variety of factors including the specific polymeric material(s), cross-linking initiator and co-cross-linking agent employed and the amounts of linear low density or other polymeric materials, if any, employed. In general, the extrusion step in the preparation of the sheet is conducted at temperatures between 80° and 130° C., preferably from 85° to 120° C. Preferably, the composition is exposed to these temperatures for less than 10, preferably for less than 5 minutes.

In a preferred method for preparing the sheet material, a relatively low amount of the olefinic polymer(s) is dry blended with the cross-linking initiator, blowing agent and co-cross-linking agent, if any. Subsequently, this mixture which comprises a high concentration of cross-linking initiator and blowing agent is mixed, just prior to the extruder from which the sheet is prepared, with the remaining amounts of the olefinic polymer(s). In this manner, the cross-linking of the olefinic polymer(s) is yet further reduced in the preparation of the sheet from which the foam is prepared.

Following formation of the foaming composition as a sheet, the sheet is subsequently foamed at conditions to form a foam having the desired microcell structure. In general, the foaming operation comprises subjecting the sheet material to a first temperature ("pre-heating") and thereafter subjecting the sheet material to a second and generally higher ("foaming") temperature. At the first temperature, the olefinic polymer(s) is cross-linked to a significant degree without substantial decomposition of the blowing agent and/or foaming of the sheet. To achieve this result, this pre-heating of cross-linking operation is conducted at temperatures of less than 180° C., preferably from 150° to 170° C. Most preferably, the pre-heat temperature is from 150° C. to 165° C. The time required at such pre-heating temperature to significantly cross-link the foam is dependent on specific components of the foaming composition and the thickness of the sheet material, but the sheet material is exposed to the pre-heat temperatures for less than 15 minutes, more advantageously less than 10 minutes. Preferably, the pre-heating is conducted for a time period of from 2 to 10 minutes.

The foaming operation is preferably conducted at temperatures from 190° C. to 240° C., preferably from 200° to 230° C. Advantageously, the foaming composition is exposed to these temperatures for less than 15 minutes, preferably less than 10 minutes. More preferably, the foaming composition is exposed to these temperatures for a time of from 2 to 8 minutes.

Using the method of the present invention, the temperatures of the pre-heat and foaming operation are significantly lower than those employed in the preparation of foams having normal cell structure. Alternatively, the times required for pre-heating and foaming at these lower temperatures are higher than the times required for the preparation of foams having a normal cell structure. However, the times required for pre-heating and foaming are sufficiently short in that a foam having the desired microcell structure can be prepared in a continuous operation at a relatively high efficiency.

Subsequent to the foaming operation, the now foamed sheet is cooled. If desired, the surfaces of the sheet can now be smooth and/or the thickness of the sheet made uniform. The foam sheet can be subjected to any desired secondary process in the course of cooling such as embossing by means of an embossing roll, lamination with plastic sheet or cloth by heating or adhesive, two direction drawing, vacuum molding or compression molding. Moreover elongated foam strengths can be manufactured continuously by passing the foam sheet between two rolls each provided with semi circulate grooves on the surface.

The following Examples are set forth to illustrate the method of the present invention and should not be construed to limit its scope. In the Examples, all parts and percentages are by weight unless otherwise indicated.

For the purposes of the present invention and the following Examples, the density is measured by ASTM test method D-1564-71-W, the tensile strength is measured by the techniques of ASTM test method designated D-1564-71-T, the tear strength was measured by the techniques of ASTM test method designated D-624-73, the compression was measured by the methods described in ASTM D-1564-71-D, the elasticity was measured using the techniques described in ASTM D-1564-71-R and the cross-linking degree was determined by the techniques of ASTM D-2765-68.

EXAMPLE 1

A pre-mixture was prepared by dry blending 100 parts of a powder of low density polyethylene having a melt index of 3.5 grams/minutes, a density of 0.918 g/cc and a Vicat softening temperature of 88 C, 15 parts of an azodicarbonamide blowing agent, 0.5 part of 1,1-di-tert-butylperoxy-3,3,5-trimethyl-cyclohexane cross-linking agent and 0.4 parts of triallylcyanurate co-cross-linking agent. The cross-linking initiator possesses a 10 hour half-life temperature of 92° C. The dry blend was then extruded at temperatures from 100°–110° C. to form a sheet having a thickness of 2 mm. The sheet material was subsequently continuously fed through an oven having a pre-heat section and foaming section. The pre-heat section was maintained at temperature of 160° C. and the foaming section at 200°–220° C. The sheet was exposed to the pre-heat temperature for 4 minutes and to the foaming temperature for 4 minutes. The resulting foam had a thickness of 7.4 mm.

The resulting foam had a cell size of 0.25 mm and was found to exhibit a density of 35.3 g/cm$^3$, a tensile strength of 4.2 kg/cm$^3$ and an elongation of 106 percent. The compression strength of the foam was measured to be 0.47 kg/cm$^2$ and the elasticity found to be 40 percent.

EXAMPLE 2

A second sheet was prepared in an identical manner except that it was prepared at a thickness of 1.5 mm from a pre-mixture containing only 0.4 part of the initiator and 0.3 part of the co-cross-linking agent. Due to the lower amounts of cross-linking initiator and co-cross-linking agent employed, a longer pre-heating time was required for foam preparation. Specifically, pre-heating conditions of 6 minutes at 160° C. and the foaming conditions of 4 minutes at 200°–220° C. were employed to form the desired foam product. The cell size of the resulting foam was 0.22 mm.

EXAMPLE 3

A sheet was prepared in an identical manner to the techniques used in Example 1 except that 1.7 parts of the initiator and no co-cross-linking agent were employed. Pre-heating conditions of 15 minutes at 150° C. and foaming conditions of 8 minutes at 200°–220° C. were employed to form a foam having a microcell structure.

I claim:

1. A method for the preparation of a cross-linked microcellular foam of a low density polyethylene or a blend of low density polyethylene with one or more other polymer(s), the method comprising the steps of mixing the low density polyethylene, a blowing agent, a cross-linking initiator, and if employed, other polymer(s) and additives, forming the resulting mixture into a sheet material without substantially cross-linking the olefinic polymer(s) and without substantial decomposition of the blowing agent, thereafter continuously producing from the sheet material a significantly cross-linked microcellular foam by pre-heating the sheet material at a temperature of from 150° C. to less than 180° C. for a period of less than 15 minutes, and subsequently heating the pre-heated sheet at a second and higher temperature, for a period of less than 15 minutes to produce the significantly cross-linked microcellular foam wherein the cross-linking agent has a ten hour half-life temperature of more than 80° C. and less than 110° C.

2. A method as claimed in claim 1 characterised in that the foaming mixture further comprises a co-cross-linking agent having two or more ethylenically unsaturated groups.

3. A method as claimed in claim 2 characterised in that the co-cross-linking agent is triallyl cyanurate, diallyl phthalate or butanediol diacrylate.

4. A method as claimed in claim 1 characterised in that the cross-linking initiator has a ten hour half life temperature of from 85° to 100° C.

5. A method as claimed in claim 4 characterised in that the cross-linking initiator is 1,1-di-tert-butylperoxy-3,3,5-trimethylcyclohexane.

6. A method as claimed in claim 1 characterised in that the pre-heating is conducted for a period of less than 10 minutes, and the temperature during the pre-heating is in the range of 150° to 170° C.

7. A method as claimed in claim 1 characterised in that the heating at the second and higher temperature is conducted for a period of less than 10 minutes, and the higher temperature is from 190° to 240° C.

8. A method as claimed in claim 1 wherein the sheet material is formed by extruding a blend of the low density polyethylene, the cross-linking initiator, the blowing agent, and if employed, the co-cross-linking agent and other polymeric materials and additives at extrusion temperatures of 90° to 125° C.

9. A method as claimed in claim 8 wherein the sheet material is prepared by dry blending a proportion of the total amount of the olefinic polymer(s) with the cross-linking initiator and blowing agent, and blending the resulting mixture with the remaining amount of olefinic polymer(s) prior to its extrusion.

10. A method as claimed in claim 1 wherein the composition is substantially free of aromatic carboxylic or aliphatic fatty acid salts of transition metals of groups 7 or 8 of the perioxic table.

* * * * *